(12) United States Patent
Tian et al.

(10) Patent No.: US 6,560,286 B1
(45) Date of Patent: May 6, 2003

(54) FIELD FRAME MOTION DESIGN FOR DIGITAL VIDEO DECODER

(75) Inventors: Jun Tian, Semi Valley, CA (US); Val G. Cook, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,183

(22) Filed: Dec. 29, 1999

(51) Int. Cl.$^7$ ............................................... H04N 7/12
(52) U.S. Cl. ............................... 375/240.16; 348/699
(58) Field of Search ......................... 348/699, 407, 348/416; 382/236, 107, 232; 375/240, 240.21, 240.16

(56) References Cited

U.S. PATENT DOCUMENTS

| | | | |
|---|---|---|---|
| 5,614,952 A | | 3/1997 | Boyce et al. |
| 5,760,835 A | * | 6/1998 | Fujiwara et al. ............ 348/402 |
| 6,154,491 A | * | 11/2000 | Uetani .................... 375/240.16 |
| 6,269,484 B1 | * | 7/2001 | Simsic et al. ............... 725/151 |
| 6,343,100 B1 | * | 1/2002 | Fujiwara et al. ........ 375/240.17 |
| 6,445,741 B1 | * | 9/2002 | Bellers et al. .......... 375/240.16 |

OTHER PUBLICATIONS

Lance Williams. "Pyramidal Parametrics", Computer Graphics Laboratory: Jul. 1983. pp 1–11.

* cited by examiner

*Primary Examiner*—Vu Le
*Assistant Examiner*—Behrooz Senfi
(74) *Attorney, Agent, or Firm*—Blakely, Sokoloff, Taylor & Zafman LLP

(57) ABSTRACT

A method and apparatus for improved processing of digitized moving pictures. A motion vector for field frame processing is produced using fewer pixels from the source image and fewer coefficients than are required by the prior art. This allows field frame motion to be processed using no more pixels than are required for other forms of motion processing, which in turn reduces the circuitry and processing time required. A reduction in the pixel processing requirement allows less circuitry to be used for this processing with equivalent throughput. Alternatively, it allows for improved throughput with an approximately equivalent amount of circuitry.

22 Claims, 3 Drawing Sheets

| Motion Vector Position | Filters for Destination Pixel Value |
|---|---|
| 0 | $A1$ |
| 1 | $(A1+B1)/2$ |
| 2 | $B1$ |
| 3 | $(A1*k1+A2*k2+B1)/2$ |
| 4 | $(A1*k1+A2*k2)$ |
| 5 | $(A1*k1+A2*k2+B1*k1+B2*k2)/2$ |
| 6 | $(B1*k1+B2*k2)$ |
| 7 | $(B1*k1+B2*k2+A2)/2$ |

| Motion Vector Position | Destination Pixel Value |
|---|---|
| 0 | A1 |
| 1 | (A1+B1)/2 |
| 2 | B1 |
| 3 | (A0*h0+A1*h1+A2*h2+A3*h3+B1)/2 |
| 4 | (A0*h0+A1*h1+A2*h2+A3*h3) |
| 5 | (A0*h0+A1*h1+A2*h2+A3*h3+B0*h0+B1*h1+B2*h2+B3*h3)/2 |
| 6 | (B0*h0+B1*h1+B2*h2+B3*h3) |
| 7 | (B0*h0+B1*h1+B2*h2+B3*h3+A2)/2 |
FIG. 2
*(Prior Art)*
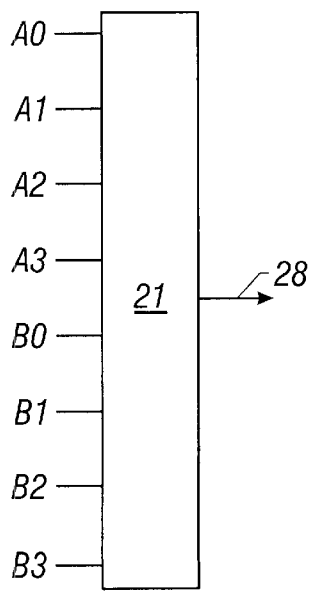
FIG. 3A
*(Prior Art)*
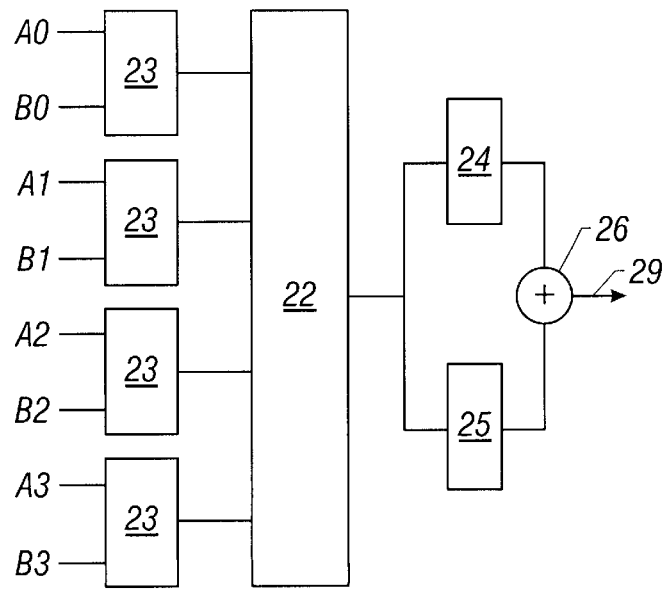
FIG. 3B
*(Prior Art)*

| Motion Vector Position | Filters for Destination Pixel Value |
|---|---|
| 0 | A1 |
| 1 | (A1+B1)/2 |
| 2 | B1 |
| 3 | (A1*k1+A2*k2+B1)/2 |
| 4 | (A1*k1+A2*k2) |
| 5 | (A1*k1+A2*k2+B1*k1+B2*k2)/2 |
| 6 | (B1*k1+B2*k2) |
| 7 | (B1*k1+B2*k2+A2)/2 |

FIELD FRAME MOTION DESIGN FOR DIGITAL VIDEO DECODER

BACKGROUND OF THE INVENTION

1. Field of the Invention

The invention relates generally to the field of video decoding. More particularly, it relates to an improvement in processing motion vectors in the downsampling of digitized video data.

2. Description of the Related Art

Moving pictures can now be stored, transmitted, retrieved and processed in digital form, allowing the benefits of computer technology to be extended to the technology of moving pictures. However, the extensive amount of information present in moving pictures creates a very large amount of digital data, resulting in excessive storage and/or transmission requirements. Various forms of compression have been developed to convert the source images to a reduced-data format for storage and/or transmission. For display, this reduced data is reconverted to destination images that are equivalent to the source images.

Digital compression methods can also be combined with other conversion processes. Digital moving pictures are frequently recorded at the highest resolution that is currently feasible, but must be converted to lower resolution for display on the display devices that are most common, and for picture-in-picture applications.

Conversion techniques generally divide the image into subunits called macroblocks (typically 16×16 pixels) and then operate on each macroblock individually. Motion vectors are used to describe motion within a macroblock from one frame to the next. A motion vector can contain several components, with each component denoting the horizontal and vertical displacement from the current target pixel location to find the source pixel value.

Digital sequences must sometimes be coded as a mixture of sequential pictures, in which the entire picture is generated with sequential scan lines, and interlaced pictures, in which the even numbered rows of pixels (even field) are generated first, and the odd numbered rows of pixels lines (odd field) are placed between them. The decoder must handle such a mixture in a coded bitstream. The process of a decoder generating a sequential picture by predicting it from an interlaced picture is referred to as field frame processing.

All of the above concepts are well known in the art and are not further described herein.

Common algorithms are used for processing motion vectors in field frame processing. However, these algorithms operate on twice as many pixels as do the algorithms for other types of motion processing. This requires makers of video compression systems to include additional processing capability for field frame motion that is not used for any other type of motion processing. They must either include circuitry for processing twice as many pixels as are normally needed, or they must operate on only half the field frame pixels at a time and sum the results later, which reduces throughput and requires extra logic for processing the intermediate results.

FIG. 1 shows a vertical column (1×8) of interlaced pixels from a reference picture that might be processed in field frame processing, with pixels A(0–3) representing the even field and pixels B(0–3) the odd field. With reference to these pixels, a conventional algorithm for calculating motion vectors in field frame processing is shown in FIG. 2, where filter coefficients h0, h1, h2 and h3 have predetermined constant values. Positions 0–7 represent the eight values that may define the amount of translation between the source pixel location and the destination pixel location. This process requires operating on eight source pixels for field frame motion processing, whereas the other types of motion processing can generate equivalent quality results while operating on only four pixels. FIGS. 3a and 3b show the logic for executing a conventional field frame motion vector process. In FIG. 3a, 8-input filter 21 can process all eight pixel values simultaneously and provide the results at output 28, but half of the complex filter capacity is unused for all operations except field frame motion vector processing. Alternatively, the 4-input filter 22 of FIG. 3b can be used to process the A pixels, store the results, process the B pixels, and then sum the two sets of results at output 29, but this cuts throughput significantly and requires additional logic in the form of input multiplexers 23, storage registers 25, and summation logic 26.

SUMMARY OF THE INVENTION

An embodiment of the invention is a method of generating motion vectors in a field frame image processing system. The method includes defining a column of pixels that has even rows alternating with odd rows in an interlaced video image. A predefined first set of pixels is selected from the even rows, the first set composed of less than all the pixels in the even rows. A predefined second set of pixels is selected from the odd rows, the second set composed of less than all the pixels in the odd rows. The first and second sets of pixels are operated on to produce a field frame motion vector.

BRIEF DESCRIPTION OF THE DRAWINGS

FIG. 2 shows a prior art process for determining a field frame motion vector.

FIGS. 3a and 3b show filter implementations of the prior art.

DETAILED DESCRIPTION OF THE INVENTION

Figure 1:
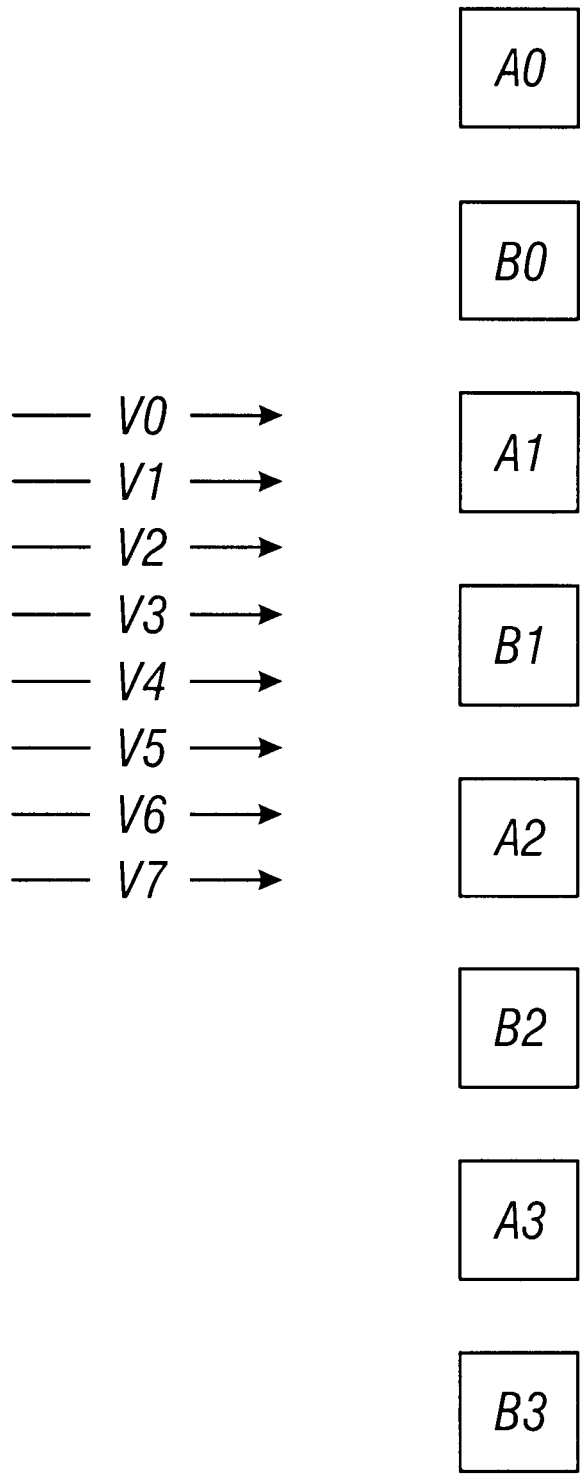
FIG. 1 shows a vertical segment of an interlaced image.
Figures 4, 5:
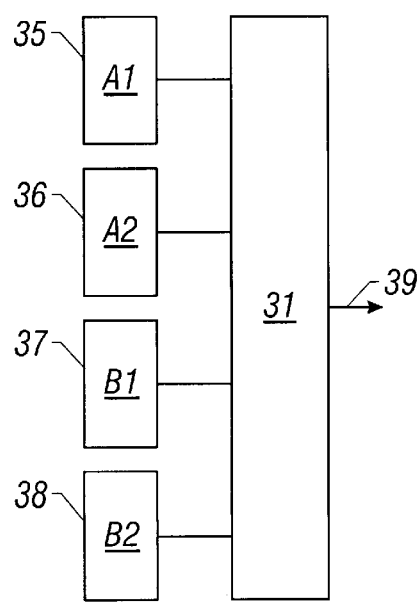
FIG. 4 shows a process of the invention for determining a field frame motion vector.
FIG. 5 shows an implementation of the invention.

The instant invention produces an improvement over the prior art by implementing a different filter sequence for field frame motion. This sequence only operates on half as many pixels as the previous techniques. Referring to FIG. 1, A0 through A3 represent sequentially ordered pixels in the even field of an eight-pixel column in an interlaced source image, while B0 through 133 represent sequentially ordered pixels in the odd field of the same column. An algorithm may be applied to the pixels in this column to produce a pixel value in the destination picture. In the case of a downsampling by 2 process, the motion vector contains eight possible fractional positions in between 2 pixels in an even or odd field. The motion vector determines the value of the destination pixel by a linear combination of corresponding pixels in the source reference picture. In one embodiment, V0 represents a fractional offset of ½, V1 a fractional offset of ¼, etc. FIG. 4 shows how to determine all eight positions using a process of the invention, where filter coefficients k1 and k2 can have the values of 0.5 and 0.5, respectively. In this implementation, a maximum of only four pixels (A1, A2, B1, and B2 from FIG. 1) in the source picture are processed, thus permitting a four-pixel processing circuit to process all the relevant pixels at once. Pixels A0, B0, A3 and B3 need not be processed at all. The visual quality of this approach has been shown to be comparable to that of the prior art method, but with much less logic and/or processing required.

Since only four pixels are processed at one time, this process can use a four-input filter 31 shown in FIG. 5 that can also be used for processing other types of motion vectors, outputting the results at output 39. Pixel buffers 35–38 can hold the pixel values A1, A2, B1, and B2 for input into filter 31, and can also hold the input values for other processing that may be performed by filter 31. Thus the improved process does not incur the inefficient use of additional logic that is needed for conventional processes as shown in FIG. 3a, and does not incur the additional time required for sequential partial processing as shown in FIG. 3b.

In one embodiment, coefficients k1 and k2 each have a value of ½, permitting a simple shifting operation to be used instead of the slower multiplication operation. Since the value of any binary number can be multiplied by ½ simply by shifting it one bit to the right (with an accuracy of one-half the least significant bit), every operation of FIG. 4 can be performed with a maximum of three adds and two 1-bit right shifts. This may produce additional operational efficiency, depending on the design of filter 31. Other values can also be used for k1 and k2, producing possibly different results in final image quality, but without the binary processing simplicity that is inherent when values of 0.5 are used.

Filter 31 may be implemented in various forms, including a processor, digital signal processor, discrete logic, software, firmware, or any combination of these. Output 39 can be in various forms, depending on the requirements of subsequent processing, including single or multiple output lines for a hardware implementation or software data for a software implementation.

The aforementioned description is intended to be illustrative and not limiting. Other variations will occur to those of skill in the art. Such variations are intended to be encompassed by the invention, which is limited only by the scope and spirit of the appended claims.

We claim:

1. A method, comprising:

operating on second and third pixels of four even pixels and second and third of four odd pixels in a column of pixels comprising even pixels in even rows of a frame and odd pixels in odd rows of the frame to produce a field frame motion vector;

wherein said motion vector has first through eighth positions and operating includes performing calculations of $V0=A1$ $V1=(A1+B1)/2$ $V2=B1$ $V3=(A1*k1+A2*k2+B1)/2$ $V4=A1*k1+A2*k2$ $V5=(A1*k1+A2*k2+B1*k1+B2*k2)/2$ $V6=(B1*k1+B2*k2)$ $V7=(B1*k1+B2*k2+A2)/2$ wherein said V0 through V7 represent the first through eighth positions of the motion vector, said A1 and A2 represent the second and third of four even pixels, said B1 and B2 represent the second and third of four odd pixels, and said k1 and k2 represent first and second coefficients.

2. The method of claim 1, wherein said k1 has a value of 0.5 and said k2 has a value of 0.5.

3. The method of claim 1, wherein said operating includes processing in a digital signal processor.

4. The method of claim 1, wherein said operating includes processing in a discrete logic circuit.

5. The method of claim 1, wherein said operating includes processing in software.

6. The method of claim 1, wherein said operating includes processing in firmware.

7. A system, comprising:

first through fourth pixel buffers to hold first through fourth even-row pixel values, respectively;

fifth through eighth pixel buffers to hold first through fourth odd-row pixels, respectively;

a digital filter having
a first input coupled to the second pixel buffer to receive the second even-row pixel value;
a second input coupled to the third pixel buffer to receive the third even-row pixel value;
a third input coupled to the sixth pixel buffer to receive the second odd-row pixel value;
a fourth input coupled to the seventh pixel buffer to receive the third odd-row pixel value;
a processor coupled to the first through fourth inputs to process the second and third even-row pixel values and the second and third odd-row pixel values; and
an output coupled to the processor to output a field frame motion vector;

wherein the processor includes a processing section to perform calculations of $V0=A1$ $V1=(A1+B1)/2$ $V2=B1$ $V3=(A1*k1+A2*k2+B1)/2$ $V4=A1*k1+A2*k2$ $V5=(A1*k1+A2*k2+B1*k1+B2*k2)/2$ $V6=(B1*k1+B2*k2)$ $V7=(B1*k1+B2*k2+A2)/2$ wherein said V0 through V7 represent first through eighth positions of the motion vector, said A1 and A2 represent values at the first and second inputs, said B1 and B2 represent values at the third and fourth inputs, and said k1 and k2 represent first and second coefficients.

8. The system of claim 7, wherein said k1 has a value of 0.5 and said k2 has a value of 0.5.

9. The system of claim 7, wherein the digital filter includes a digital signal processor.

10. The system of claim 7, wherein the digital filter includes a discrete logic circuit.

11. The system of claim 7, wherein the digital filter includes a software filter.

12. The system of claim 7, wherein the digital filter includes a firmware filter.

13. A digital filter, comprising:
a first input coupled to a first buffer to receive a value of a second of four even-row pixels in a column of pixels;
a second input coupled to a second buyer to receive a value of a third of the four even-row pixels in the column of pixels;
a third input coupled to a third buffer to receive a value of a second of four odd-row pixels in a column of pixels;
a fourth input coupled to a fourth buffer to receive a value of a third of the four odd-row pixels in a column of pixels;
a processor coupled to the first through fourth inputs; and
an output coupled to the processor to output a field frame motion vector;
wherein the processor includes a processing section to perform the calculations:

$$V0=A1$$
$$V1=(A1+B1)/2$$
$$V2=B1$$
$$V3=(A1*k1+A2*k2+B1)/2$$
$$V4=A1*k1+A2*k2$$
$$V5=(A1*k1+A2*k2+B1*k1+B2*k2)/2$$
$$V6=(B1*k1+B2*k2)$$
$$V7=(B1*k1+B2*k2+A2)/2$$

wherein said V0 through V7 represent first through eighth positions of the motion vector, said A1 and A2 represent values at the first and second inputs, said B1 and B2 represent values at the third and fourth inputs, and said k1 and k2 represent first and second coefficients.

14. The digital filter of claim 13, wherein said k1 has a value of 0.5 and said k2 has a value of 0.5.

15. The digital filter of claim 13, wherein the processor includes a digital signal processor.

16. The digital filter of claim 13, wherein the processor includes a discrete logic circuit.

17. The digital filter of claim 13, wherein the processor includes a software filter.

18. The digital filter of claim 13, wherein the processor includes a firmware filter.

19. A machine-readable medium having stored thereon instructions, which when executed by at least one processor causes said at least one processor to perform the following:

$$V0=A1$$
$$V1=(A1+B1)/2$$
$$V2=B1$$
$$V3=(A1*k1+A2*k2+B1)/2$$
$$V4=A1*k1+A2*k2$$
$$V5=(A1*k1+A2*k2+B1*k1+B2*k2)/2$$
$$V6=(B1*k1+B2*k2)$$
$$V7=(B1*k1+B2*k2+A2)/2$$

wherein V0 through V7 represent first through eighth positions of a field frame motion vector, A1 and A2 represent values of second and third pixels of four even-row pixels in an interlaced column of pixels, B1 and B2 represent values of second and third pixels of four odd-row pixels in the interlaced column of pixels, and k1 and k2 represent first and second coefficients.

20. The program product of claim 19, wherein k1 has a value of 0.5 and k2 has a value of 0.5.

21. A system, comprising:
first through fourth pixel buffers to hold first through fourth even-row pixel values, respectively;
fifth through eighth pixel buffers to hold first through fourth odd-row pixels, respectively;
a digital filter having
a first input coupled to the second pixel buffer to receive the second even-row pixel value;
a second input coupled to the third pixel buffer to receive the third even-row pixel value;
a third input coupled to the sixth pixel buffer to receive the second odd-row pixel value;
a fourth input coupled to the seventh pixel buffer to receive the third odd-row pixel value;
a processor coupled to the first through fourth inputs to process the second and third even-row pixel values and the second and third odd-row pixel values; and
an output coupled to the processor to output a field frame motion vector;
wherein the processor includes a processing section to perform calculations to produce first through eighth positions of the motion vector;
wherein each coefficient operating as a multiplicand on any of the pixel values in the calculations has a value selected from a list consisting of 0.25 and 0.5.

22. The system of claim 21, wherein:
wherein said each coefficient is to operate on said any of the pixel values solely by shifting the pixel value at least one bit position.

* * * * *

UNITED STATES PATENT AND TRADEMARK OFFICE
CERTIFICATE OF CORRECTION

PATENT NO.    : 6,560,286 B1                                                                Page 1 of 1
DATED         : May 6, 2003
INVENTOR(S)   : Tian et al.

It is certified that error appears in the above-identified patent and that said Letters Patent is hereby corrected as shown below:

Column 2,
Line 55, delete "133", insert -- B3 --.

Signed and Sealed this

Seventh Day of October, 2003

JAMES E. ROGAN
*Director of the United States Patent and Trademark Office*